May 2, 1933.   F. M. POTGIETER   1,906,410
ROTARY CLUTCH
Filed March 28, 1931

Inventor
Fred M. Potgieter
By Luther Johns
Atty.

Patented May 2, 1933

1,906,410

UNITED STATES PATENT OFFICE

FRED M. POTGIETER, OF WINNETKA, ILLINOIS, ASSIGNOR TO UNIVERSAL GEAR CORPORATION, OF CHICAGO, ILLINOIS, A CORPORATION OF ILLINOIS

ROTARY CLUTCH

Application filed March 28, 1931. Serial No. 525,902.

These improvements relate to rotary clutches, with a special reference to the same as equipped with a counterbalancing means for a gripping dog or clutch member. The prime object is to render such clutches more efficient. In one respect this is accomplished by counterbalancing means, and in another respect by certain spring means employed.

Figure 1:
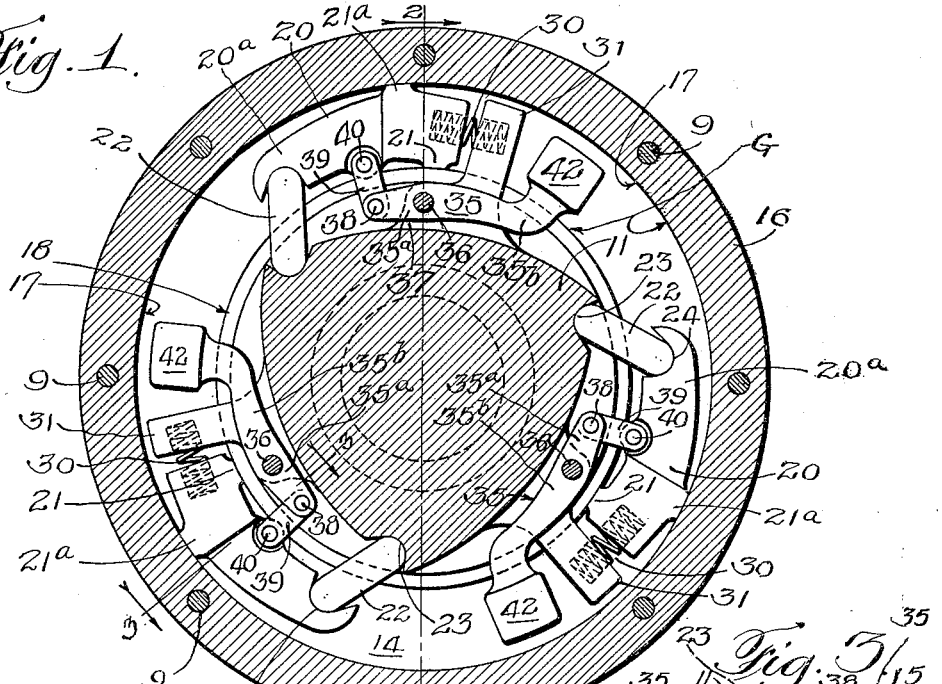
Figures 2, 3:
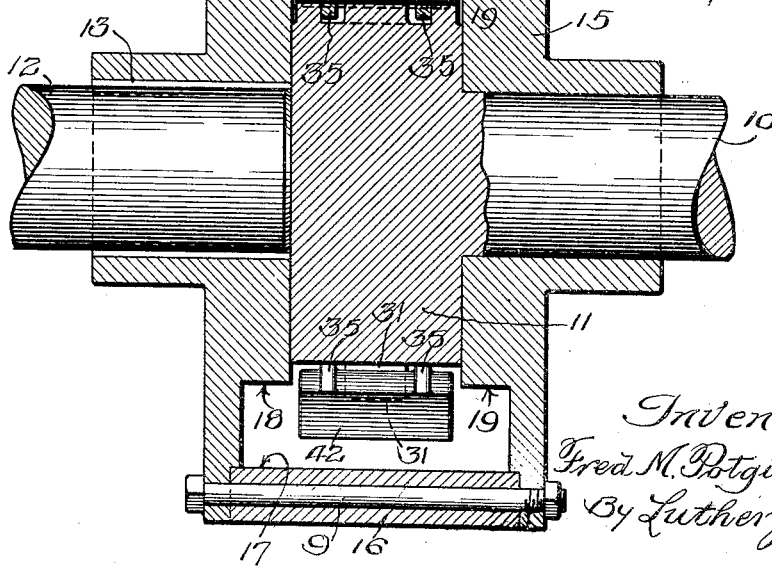

In the drawing Figure 1 is a cross section through a clutch embodying these improvements in an advantageous form;

Fig. 2 is a medial longitudinal vertical sectional view through the device as on the line 2—2 of Fig. 1; and Fig. 3 is a sectional detail on the line 3—3 of Fig. 1.

Most of the physical features of the mechanism shown are old and well known and may be described as follows: A shaft 10 which, for convenience, I shall call the input shaft, has an integral enlargement or hub 11. What I shall call the output shaft 12 has splined upon it at 13 a disc-like outer frame member 14 while a similar outer frame member 15 rotates loosely on input shaft 10. A ring 16 held by bolts 9 completes the outer member and provides an inner cylindrical surface 17 on the common axis of shafts 10 and 12. Members 14 and 15 are provided with cylindrical surfaces 18 and 19 respectively which are also on the common axis. A clutch piece 20 has a pair of radially-opposite and circumferentially-offset areas 21 and 21a adapted to bind against the surface 17 and the opposite surfaces 18 and 19. The clutch piece or gripper 20 is elongated and has a lever part 20a extending from its contact areas 21 and 21a in a generally circumferential direction. A thrust member or strut 22 is pivotally seated in a curved bearing recess 23 in hub 11 and at its other end at 24 in lever extension 20a. Since strut 22 is in a somewhat tangential arrangement it is clear that should shaft 10 and hub 11 turn in the clockwise direction in Fig. 1 the lever extension 20a would be pushed radially outward causing the areas at 21 and 21a to bind in the grooves 17—18 and 17—19 formed in the outer member.

What I have thus specifically described in connection with reference characters 10 to 24 inclusive is characteristically a clutch in accordance with what is well known.

Turning to the description of novel subject matter, I provide a compression spring 30 having its ends seated in recesses in post 31 and in the front end of clutch piece 20. Fig. 1 shows that the force of spring 30 is directly rearward and not rearward and inward.

Such a spring as 30 maintains the gripper and the strut pressed back as far as they may go, which causes the areas 21—21a to be in frictional contact with the surfaces respectively against which they bind, and these areas are therefore in position for immediate gripping action.

The more important feature of novelty in the present application resides in means for counterbalancing the gripper or clutch piece 20 against the effects of centrifugal force when the clutch is rotating at the higher speeds.

It will be noted that the action of strut 22 for gripping effects is in the same direction as that of centrifugal force acting on lever part 20a and the strut, namely outward, so that the action of centrifugal force is in the right direction to cause the binding action to take place.

The device in question is what is generally called a free-wheel clutch. The outer member will be driven in the clockwise direction by the inner member moving in that direction. Should the inner member cease to drive, as by stopping or slowing down, the outer member will continue to rotate freely in the forward direction.

The gripping areas 21 and 21a are in such close association with the respective outer and inner surfaces of the groove (which I will mark G in Fig. 1) that a very slight outward movement of the tail end of the clutch piece will effect the gripping action.

I have suggested balancing of the clutch piece and strut by lengthening or extending the clutch piece forward. This overcame the tendency of the clutch piece to tilt, due to centrifugal force, and thereby to become bound; but its increased weight increased the trouble due to the other effect of the centrifugal action—the frictional effect—which I shall presently discuss.

I here point out that there is a very great force or pressure transmitted by the gripper area as 21a upon the outer friction surface as 17, due to centrifugal force. At the higher speeds this pressure causes such great friction as to maintain the clutch piece tilted into gripping position. In addition to that, with the clutch piece free to move outward by centrifugal action, the friction is so considerable at the speeds at which free-wheeling will take place that the gripping surface 21a wears away quite rapidly. Of course there are many applications of the clutch in relatively slow-speed work where these difficulties do not seriously arise. We are here concerned chiefly with high-speed conditions, although these improvements are valuable in a clutch operating at any speed that develops an appreciable amount of centrifugal force.

I have solved all of the difficulties mentioned by providing means under the control of centrifugal force for maintaining the clutch piece as free from tilting action due to centrifugal force and as free from pressure and friction upon the outer friction surface 17 as may be desired in any given case.

These means are shown as a lever of the first class 35 pivoted at 36 upon a pin carried by the extension 37 of the hub 11. One arm 35a has pivotally connected to it at 38 a link 39 pivotally connected at 40 to the rear end portion of lever part 20a of the clutch piece. This point 40 is preferably approximately at or in line with the centre of gravity, or the centre of the mass, of the clutch piece 20 and strut 22 combined.

The other arm 35b of lever 35 has a weight 42. Arm 35b is shown longer than arm 35a, thus reducing the actual weight of counterbalance 42 necessary to balance the opposing centrifugal force. Centrifugal force acting on weight 42 (including arm 35b) will tend to draw inward arm 35a, link 39, and the whole of clutch piece 20 and strut 22. This is because a pull inward at 40 is a pull against the approximate centre of gravity of the clutch piece as a whole 20 and strut 22.

The effective weight of counterbalance 42 and arm 35b may be such as to counterbalance substantially exactly the centrifugal action of the opposing parts, but it may be more or less than that, designedly, according to the situation. It is possible to proportion the parts whereby the pull at 40 is very close to the effective middle of the mass of gripper and strut combined. Ordinarily extreme nicety in this regard will not be necessary since an approximation of that condition would leave only a small amount of weight on one side or the other of point 40 subject to centrifugal force and not compensated by weight 42. Positioning pivot 40 at any place between the ends of the gripper would give beneficial results, the degree thereof increasing as point 40 approaches the centre of mass or centre of gravity of the strut and gripper combined.

The link connection at 39 permits free movement of the clutch piece or gripper 20 for its normal operations.

I contemplate as being included in these improvements all such changes, variations and departures from what is thus specifically illustrated and described as fall within the scope of the appended claims.

I claim:

1. In a rotary clutch of the general character described, the combination of coaxial driving and driven members providing a pair of oppositely-disposed surfaces coaxial with said members, at least one of said surfaces being carried by a given one of said members, an elongated clutch piece having a part provided with radially-oppositely-disposed and circumferentially-offset areas adapted to bind upon said surfaces respectively when the clutch piece is tilted in a plane substantially at right angles to the axis of clutch rotation, said clutch piece having a lever part extending in a substantially circumferential direction from said area, with means under the control of the rotative movement of one of said members relative to the other for tilting the clutch piece for such binding action, and means under the control of centrifugal force for overcoming objectional pressure between the clutch piece and at least one of said surfaces due to centrifugal force acting upon the clutch piece.

2. The clutch of claim 1 hereof in which said last-mentioned means include a lever pivotally mounted on one of said members.

3. The clutch of claim 1 hereof in which said last-mentioned means include a lever of the first class pivotally mounted on one of said members, with a weight on one of the arms of said lever and the other arm thereof connected to the lever part of said clutch piece.

4. In a rotary clutch of the general character described having coaxial driving and driven members and a pair of oppositely-disposed surfaces coaxial with said members, at least one of said surfaces being carried by a given one of said members, with an elongated clutch piece having a part provided with radially-oppositely-disposed and circumferentially-offset areas adapted to bind upon said surfaces respectively when the clutch piece is tilted in a plane substantially at right angles to the axis of clutch rotation, said clutch piece being subject to the action of centrifugal force causing friction between it and at least one of said surfaces, with means under the control of the rotative movement of one of said members relative to the other thereof for tilting the clutch piece for such binding action, the combination therewith of means under the control of centrifugal force for opposing the friction-producing centrifugal force acting on the clutch piece.

5. The clutch of claim 4 hereof in which said last-mentioned means include a lever pivotally mounted on one of said members.

6. The clutch of claim 4 hereof in which said last-mentioned means include a lever of the first class pivotally mounted on one of said members, with a weight on one of the arms of said lever and the other arm thereof connected to the clutch piece.

7. The combination with a rotary clutch having a tiltable gripper freely in association with a pair of opposed friction surfaces and adapted to grip thereon by its tilting action and being subject to centrifugal force at the higher speeds of clutch rotation developing objectionable friction with at least one of said surfaces, of means for automatically opposing such friction-creating effects of centrifugal force upon the gripper.

8. In a rotary clutch of the general character described having coaxial driving and driven members and a pair of oppositely-disposed surfaces coaxial with said members, at least one of said surfaces being carried by a given one of said members, with an elongated clutch piece having a front part provided with radially-oppositely-disposed and circumferentially-offset areas adapted to bind upon said surfaces respectively when the clutch piece is tilted in a plane substantially at right angles to the axis of clutch rotation, said clutch piece having a lever part extending rearward in a substantially circumferential direction from said areas, with a strut mounted on one of said members and bearing against said lever part for tilting the clutch piece for such binding action, said strut and the clutch piece forming substantially a toggle, the combination therewith of compression spring means operating upon the front end of the clutch piece and pressing the clutch piece in a direction to maintain yieldingly the toggle joints tight and said areas in frictional engagement with said surfaces respectively.

FRED M. POTGIETER.